United States Patent [19]
Hoffmann

[11] Patent Number: 5,365,963
[45] Date of Patent: Nov. 22, 1994

[54] ACTUATING DRIVE HAVING A SAFETY DEVICE

[75] Inventor: Heinfried Hoffmann, Frankfurt, Germany

[73] Assignee: Samson Aktiengesellschaft, Frankfurt, Germany

[21] Appl. No.: 151,159

[22] Filed: Nov. 12, 1993

[30] Foreign Application Priority Data

Nov. 25, 1992 [DE] Germany .................. 4239580

[51] Int. Cl.⁵ ............................................ F16K 17/38
[52] U.S. Cl. ............................... 137/67; 137/79; 251/14; 251/90
[58] Field of Search ............... 137/67, 79; 251/14, 251/92, 93, 90

[56] References Cited
U.S. PATENT DOCUMENTS 4,072,159  2/1978  Kurosawa ............... 137/79 X
4,240,455 12/1980  McGee ..................... 251/14 X
4,267,853  5/1981  Yamaguchi et al. ..... 137/79 X
4,651,763  3/1987  Scobie et al. ............ 137/67 X
4,714,233 12/1987  Oates ....................... 251/93 X
4,827,963  5/1989  Baker et al. ............. 251/14 X

*Primary Examiner*—John Rivell
*Attorney, Agent, or Firm*—Hill, Steadman & Simpson

[57] ABSTRACT

An actuating drive, particularly for control valves and shut-off valves or the like, comprising a safety device that automatically brings an actuation element into a safety position, particularly a closed position, given a limit temperature that upwardly exceeds the normal temperature range, particularly in case of fire, having a swelling compound that presses the actuation element in the direction toward the safety position when it expands and which multiplies in volume upon formation of cavities when the limit temperature is upwardly exceeded.

11 Claims, 1 Drawing Sheet

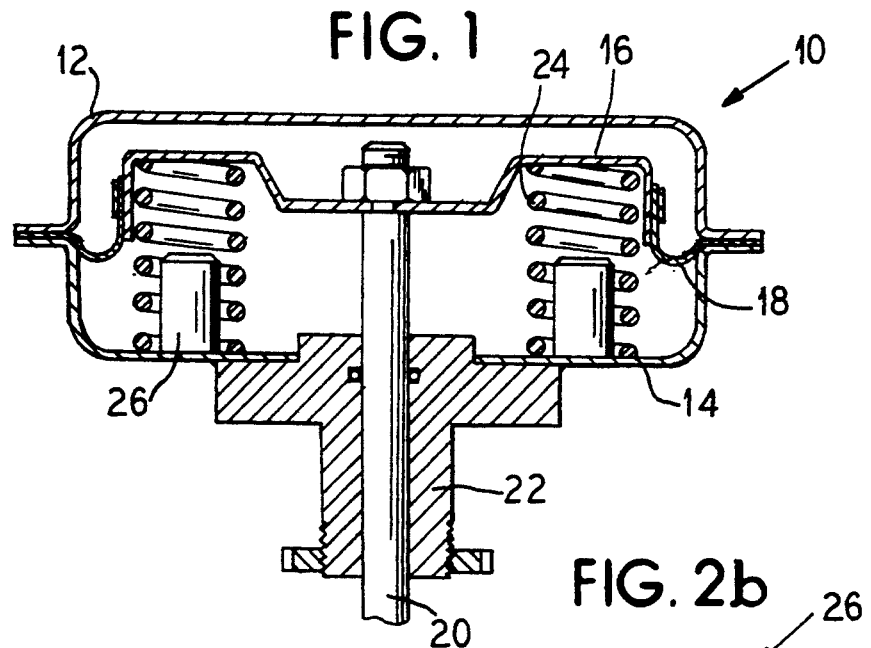
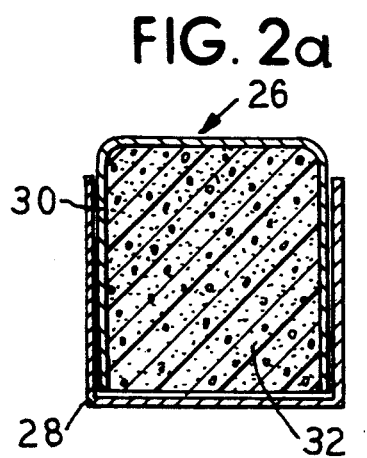
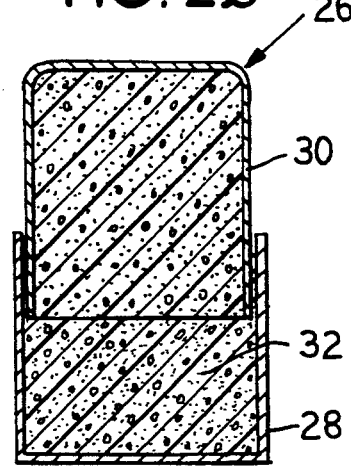
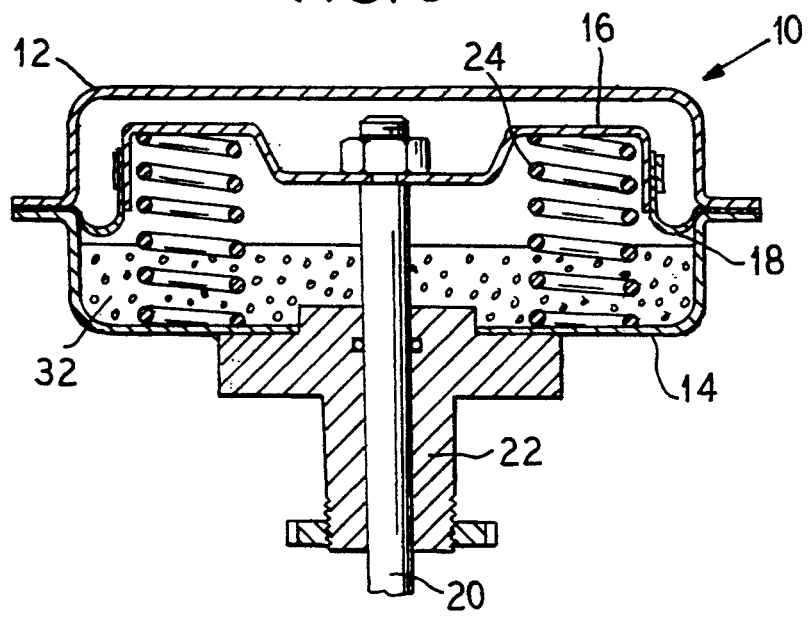

5,365,963

ACTUATING DRIVE HAVING A SAFETY DEVICE

BACKGROUND OF THE INVENTION

The invention is directed to an actuating drive, particularly for control valves and shut-off valves or the like, having a safety device that automatically brings an actuation element into a safe position, particularly a closed position, at a limit temperature that exceeds the normal temperature range, particularly under fire conditions.

"Fire proof" fittings are being increasingly demanded in automation technology. An actuating element is deemed "fire proof", for example according to the British standard BS 6755, Part II, 1987, when it is automatically moved into a safety position when a fire erupts and can be held therein over a specific time, for example 30 minutes. Given combustible materials, the safety position is thereby usually the closed position. Typically then for a "fire proof" arrangement, an actuating drive has a safety device that, when a fire breaks out, charges an actuation element in such a way that the closed position is achieved.

Energy stores in the form of springs or, given pneumatic drives, appropriate compressed air supplies or reservoirs have hitherto been employed as safety devices of this type. Since certain temperatures above the limit temperature of the energy store components are reached or even exceeded, the force of the energy store which holds the actuation element in the safety position for typical drive embodiments is lost because, for example, the membrane of a membrane drive melts or, respectively, the springs loose the hardness and become "soft". Ball valves and slides can remain in their closed position, since the medium presses the closing element against the outflow opening as a consequence of the static pressure difference. This is the reason that only ball valves and slides were previously recognized as being "fire proof".

In lift positioning devices, the valve cone is pressed up given outage of the force from the energy store if no additional measures are undertaken. As known, such measures can be making optimally long the time span until the loss of the safety position, for example on the basis of water showers, encapsulating the device in a fire proof housing, employing thermally insulating swelling coats (agents that form insulating layers) or durably obtaining the safety position on the basis of mechanical latch devices (interlocking) or on the basis of refractory spring materials (for example, "Inconell").

These measures are either extremely complicated, maintenance-unfriendly, costly or have a limited or, respectively, unreliable effectiveness.

SUMMARY OF THE INVENTION

The invention is therefore based on the object of creating an actuating drive of the species wherein the safety position can be reliably held for a long time with simple, uncomplicated means, even given temperatures that significantly exceed the limit temperature.

This object is inventively achieved by a swelling compound that upon expansion presses the actuation element in the direction toward the safety position and which increases its volume upon formation of cavities, when the limit temperature is upwardly exceeded.

It can thereby be provided that the swelling compound is composed of a swelling paste that swells with multiplication of volume when the limit temperature is upwardly exceeded, and then hardens.

The invention also proposes that the safety device, in addition to comprising the swelling compound, comprises an energy store such as a compressed air store or spring that brings the actuation element into the safety position essentially without delay when the limit temperature is upwardly transgressed. The swelling compound is set such with respect to its expansion and, potentially, hardening behavior and with respect to its mass that it can hold the actuation element in its safety position even after a material-conditioned slackening of the actuating power of the energy store, for example when the springs become soft or when the membranes melt.

A further embodiment of the invention is characterized in that the swelling compound is arranged within a telescoping piston/cylinder unit that can be supported at one end against a housing part of the actuating drive and abuttable at an opposite end against the actuation element once expanded. The piston/cylinder unit is in its retracted position under normal operating conditions of the actuating drive.

It can thereby be provided that the piston/cylinder unit is composed of a cup-shaped cylinder part and of a piston part that is likewise cup-shaped, whereby the outside diameter of the piston part is slightly smaller than the inside diameter of the cylinder part. The cylinder part and the piston part have essentially the same height. The piston part, under normal operating conditions of the actuating drive, has its open end essentially completely thrust into the open end of the cylinder part, and the piston part is filled with the swelling compound.

The invention also proposes that the piston/cylinder unit is arranged within a coil spring that is supported at one end at a housing part of the actuating drive and, at an opposite end, is abutted to the actuation element, and which forms the energy store.

Another embodiment of the invention provides that the swelling compound is arranged within a housing of a pneumatic membrane drive at that side of a diaphragm disk facing away from the safety position.

It can thereby also be provided that the swelling compound is directly applied to at least a part of the inside wall of the housing.

According to the invention, an actuating drive is moved, particularly a pneumatic drive for either lifting or swivelling motion, into the safety position or, respectively, holding it thereat in a simple way. A swelling compound is employed preferably in addition to the traditional energy store in the form, for example, of a spring means, this swelling compound expanding with a multiplication in volume and a formation of cavities when the limit temperature is upwardly exceeded and preferably then hardening, so that it can still hold the drive in its safety position given a loss of the actuating power of the energy store.

Further features and advantages of the invention derive from the claims and from the following description wherein an exemplary embodiment is set forth in detail with reference to the schematic drawing.

BRIEF DESCRIPTION OF THE DRAWINGS

FIG. 1 is an axial sectional view of an exemplary embodiment of an actuating drive of the invention;

FIG. 2a is an axial longitudinal sectional view of a piston/cylinder unit having swelling compound of the actuating drive of FIG. 1 under normal operating conditions;

FIG. 2b is an axial longitudinal sectional view of the piston/cylinder unit of FIG. 2a after the limit temperature has been upwardly exceeded in a fire; and FIG. 3 is an axial sectional view of an alternate embodiment of the invention.

DETAILED DESCRIPTION OF THE PREFERRED EMBODIMENT

As FIG. 1 shows, a pneumatic actuating drive 10 essentially comprises two housing shells 12, 14, a diaphragm disk 16 and a membrane 18 therebetween, a drive rod 20 and a connector part 22 and a piston/cylinder unit 26 arranged within a compression spring 24 that is fashioned as a coil spring.

This piston/cylinder unit 26 is shown in section in FIG. 2. It is composed of a cup-shaped cylinder part 28 and of a likewise cup-shaped piston part 30 which has its open end interfit into the likewise open end of the cylinder part 28 with relatively great play. The piston part 30 is filled with a swelling paste 32. Such pastes are commercially obtainable, for example under the trademark "FOMOX" and are usually employed for the purpose of reliably closing wall bushings in case of fire. The swelling paste expands greatly upon formation of cavities at a higher temperature and then hardens ceramic-like.

Shapes other than that shown in FIG. 2 are possible for retaining the swelling paste.

Under normal operating conditions, the swelling compound 32 which fills the piston part 30 and, thus, the piston/cylinder unit 26 are in the position shown in FIG. 2a. When a fire occurs, the system is usually immediately moved into the safety position, i.e., the drive rod 20—given the pneumatic actuating drive of FIG. 1—is retracted upwardly due to the force of the compression spring 24. Given a further rise in temperature, the membrane 18 will then first melt away, whereby this has no influence on the safety position. Given a further rise in temperature but still before the spring 24 looses its compressive force, the swelling compound 32 expands and develops a force and, since the "foam" hardens, holds the disk 16 and thus the actuating drive 10 and, thus, the entire positioning device in its safety position against external forces.

As illustrated in FIG. 3, an alternative solution is comprised therein that the swelling compound 32 is applied in paste form in an adequate quantity in the spring space, for example on the inside of the housing shell 14.

Both individually as well as in arbitrary combinations, the features of the invention disclosed in the above specification, in the claims and in the drawing can be utilized for realizing the various embodiments of the invention.

Although the present invention has been described with reference to a specific embodiment, those of skill in the art will recognize that changes may be made thereto without departing from the scope and spirit of the invention as set forth in the appended claims.

I claim as my invention:

1. An actuating drive for a control valve having control valve element, comprising:
   an actuation element which is mechanically connected to the control valve element;
   a safety means for moving the actuation element in a first direction to a safety position to bring the control valve element into a safety condition; and
   a swelling compound that restricts retreat of the actuation element in a second direction away from the safety position, the swelling compound expands and multiplies in volume upon formation of cavities when a limit temperature, that upwardly exceeds a normal temperature range, is upwardly exceeded.

2. An actuating drive according to claim 1, wherein the swelling compound is composed of a swelling paste that after expanding upon multiplication of the volume when the limit temperature is upwardly exceeded, hardens.

3. An actuating drive according to claim 1, wherein the safety means comprises an energy store means for bringing the actuation element into the safety position substantially without delay when the limit temperature is upwardly transgressed.

4. An actuating drive according to claim 3 further comprising a housing surrounding a pneumatic membrane drive and said actuation element, and said actuation element moves with said membrane drive, and said actuation element comprising a diaphragm disk wherein the swelling compound is arranged within the housing at that side of the diaphragm disk that faces away from the safety position.

5. An actuating drive according to claim 4, wherein the swelling compound is directly applied at least to a part of an inside wall of the housing.

6. An actuating drive for a control valve having a control valve element, comprising:
   an actuation element which is mechanically connected to the control valve element;
   a swelling compound that presses the actuation element in a direction toward a safety position, the swelling compound expands and multiplies in volume upon formation of cavities when a limit temperature that upwardly exceeds a normal temperature range, is upwardly exceeded;
   a housing part stationary with respect to the actuation element; and
   a telescoping piston/cylinder unit holding the swelling compound therein, supported at one end against the housing part and, at an opposite end, abutting the actuation element.

7. An actuating drive according to claim 6, wherein the piston/cylinder unit is composed of a cup-shaped cylinder part and of a likewise cup-shaped piston part, whereby the outside diameter of the piston part is slightly smaller than the inside diameter of the cylinder part, the piston part has its open end inserted substantially completely into the open end of the cylinder part under normal operating conditions of the actuating drive, and the piston part is filled with the swelling compound.

8. An actuating drive according to claim 6, wherein the actuating drive includes safety means comprising a coil spring and the piston/cylinder unit is arranged within the coil spring, the coil spring being supported on one end at the housing part of the actuating drive and, at the other end, abutting the actuation element.

9. An actuating drive having a safety means for bringing an actuation element into a safety position, during an excessive temperature occurrence including a safety mechanism for moving the actuation element in a first direction during the excessive temperature occurrence, and a swelling compound that also presses the actuation element in said first direction, said swelling compound expanding and multiplying in volume upon exceeding a temperature limit, said swelling compound comprising a swelling paste which expands under formation of cavities upon exceeding the temperature limit and hardens in a ceramic-like manner, said swelling paste, after hardening, maintaining said actuation element in its safety position against external forces.

10. An actuating drive according to claim 9, wherein the safety mechanism comprises an energy store means for bringing the actuation element into the safety position substantially without delay when the temperature limit is upwardly transgressed.

11. An actuating drive according to claim 9 further comprising a housing surrounding a pneumatic membrane drive and said actuation element, and said actuation element moves with said membrane drive, and said actuation element comprising a diaphragm disk, wherein the swelling compound is arranged within the housing at that side of the diaphragm disk that trails the first direction.

* * * * *